United States Patent
Kong et al.

(10) Patent No.: US 7,421,271 B2
(45) Date of Patent: Sep. 2, 2008

(54) SECTOR SWITCHING DETECTION METHOD

(75) Inventors: Hongwei Kong, Denville, NJ (US); Subramanian Vasudevan, Morristown, NJ (US); Henry Hui Ye, Ledgewood, NJ (US); Jialin Zou, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 479 days.

(21) Appl. No.: 10/822,434

(22) Filed: Apr. 12, 2004

(65) Prior Publication Data

US 2005/0227693 A1 Oct. 13, 2005

(51) Int. Cl.
*H04Q 7/20* (2006.01)
(52) U.S. Cl. ...................................... 455/436
(58) Field of Classification Search .................. 455/436, 455/452.1, 33.1, 34.1, 53.1; 370/337, 331
See application file for complete search history.

(56) References Cited

U.S. PATENT DOCUMENTS 5,774,790 A * 6/1998 Dupuy ........................ 370/337
6,799,045 B1 * 9/2004 Brouwer ..................... 455/453
6,873,607 B1 * 3/2005 Hamada et al. ............. 370/321
2002/0111158 A1 * 8/2002 Tee ............................ 455/421
2003/0142656 A1 7/2003 Padovani et al.
2003/0206541 A1 * 11/2003 Yun et al. ................... 370/337
2003/0223400 A1 * 12/2003 Knisely et al. ............. 370/346
2004/0202131 A1 * 10/2004 An et al. ..................... 370/331

FOREIGN PATENT DOCUMENTS

WO WO 99/63677 12/1999
WO WO 01/41482 A1 6/2001

OTHER PUBLICATIONS

European Search Report for Application No. EP 05 25 1775 mailed Jan. 26, 2006.

* cited by examiner

*Primary Examiner*—Duc Nguyen
*Assistant Examiner*—Eric Elcenko

(57) ABSTRACT

A sector switch detection method incorporates two independent, concurrent switch detection processes within a sector switch detection block. A frame-based switch detection process operates over a given single period, while a sliding window-based detection system operates over a selected multiple of periods.

15 Claims, 5 Drawing Sheets

SECTOR SWITCHING DETECTION METHOD

BACKGROUND OF THE INVENTION

1. Field of the Invention

This invention relates to wireless communication systems.

2. Description of the Related Art

Communication systems, such as wireless systems, are designed to meet various subscriber demands. Service providers continuously seek ways to improve the overall performance of the communication system. In the past, wireless communication systems have been used for voice communications, but more recent technological developments have allowed high speed data transmission as well. As wireless communications become more and more popular for subscribers to obtain data (i.e., e-mail or information from the internet), communication systems should be capable of a higher throughput and be tightly controlled to maintain a high quality of service. Communication is conducted according to any desired communications standard, such as the Universal Mobile Telecommunications Standard (UMTS) or a CDMA standard.

As is known in the art and shown generally in FIG. 1, a wireless communication system 100 serves a service coverage area that is divided into cells 101 having one or more sectors 102. A base station 104 is associated with the sectors 102 in at least one cell 101. Adaptive modulation and coding allows selection of an appropriate transport format (e.g., modulation and coding) for the current channel conditions seen by the user. There are two directions of data flow in such systems; communications from the base station 104 to a mobile device 106 are considered to flow in a downlink direction while the communications originating at the mobile device and sent to the base station are considered to flow in an uplink direction.

As the mobile device 106 moves from one sector 102 to another, the mobile device 106 chooses which base station 104/sector 102 among a set of candidate base stations 104/sectors 102 will provide the best service to it. The mobile device 106 indicates which sector 102/base station 104 it will be served by sending the identity of the chosen sector 102/base station 104 on the uplink. The mobile device 106 may also notify other base stations 104 of its chosen base station 104/sector 102. The resource metrics needed to communicate with the mobile device 106 (e.g. data packets) are then transferred to the chosen base station 104/sector 102, and then data is sent from the chosen base station 104/sector 102 down to the mobile device 106.

The actual protocol used by the mobile device 106 to indicate its desire to switch to a particular base station 104/sector 102 among a group of candidate base stations 104/sector 102 and denote its intent to switch to the chosen base station 104/sector 102 at a particular time is specified according to the applicable communications standard (e.g., CDMA Revisions C and D) used by the system 100. The switching protocol in these current communications standards can function effectively only if the network infrastructure (which comprises base stations and additional controlling entities, such as radio network controllers) reliably detects the mobile device's indication of a switch. One such mechanism would be to monitor the mobile's transmissions continuously for a switch indication at the base station 104 with which it is currently in communication. Once the mobile device's switch indication is detected at this base station 104/sector 102, it may transfer data resources to the new base station/sector selected by the mobile device 106. However, because the link between the mobile device 106 and the current base station 104/sector 102 is weakening (i.e., the newly selected base station 104/sector 102 has a better link to the mobile device 106 than the current base station 104/sector 102), it is possible that the current base station 104/sector 102 may miss the switch indication from the mobile device 106.

Although more complex algorithms may be executed in a central entity, such as a radio network controller 116, to increase sector switch detection reliability, such algorithms require a large amount of data to be transferred from the base station to the central entity, which does the actual switch detection calculation and determination. This introduces a great deal of processing delay. Moreover, the limited bandwidth between the base stations and the central entity as well as the limited processing power at the central entity itself makes more complex algorithms an unrealistic solution for improving switch detection reliability.

There is a desire for a mechanism that will reliably detect the sector switch indication from the mobile device 106 and accurately estimate the time at which the mobile device 106 will switch from one sector 102 to another. There is also a desire to conduct reliable sector switch detection without requiring large amounts of data to be transferred from the base stations to the central entity to evaluate whether the mobile device 106 has actually sent a sector switch indication.

SUMMARY OF THE INVENTION

The present invention is directed to a method for reliably and accurately detecting a sector switch indication from a mobile device. A set of active sectors, which correspond to sectors that may be chosen by the mobile device as a new serving sector, monitors the mobile device for the sector switch indication. The sector switch indication includes the identity of the base station/sector having the strongest communication link with the mobile device. Once the sector switch indication is made for a predetermined period of time, the mobile device links with the identified sector to make that sector the serving sector.

In one embodiment, the method incorporates an algorithm having two switch detection processes that run concurrently and independently with a sector switch detection block at each of the active set sectors. A frame-based switch detection process operates over a given period, while a sliding window-based detection system operates over a selected multiple of periods. The frame-based switch detection process is used to predict the actual time of the sector switch. The sliding window-based switch detection process is used to reliably determine the switch indication, with low miss and false alarm probabilities, in at least one active sector (e.g., the sector with the strongest link to the mobile device) while ensuring that false alarm reports from all active sectors, especially those with weak links to the mobile device, are kept at acceptably low levels.

DETAILED DESCRIPTION

Figure 1:
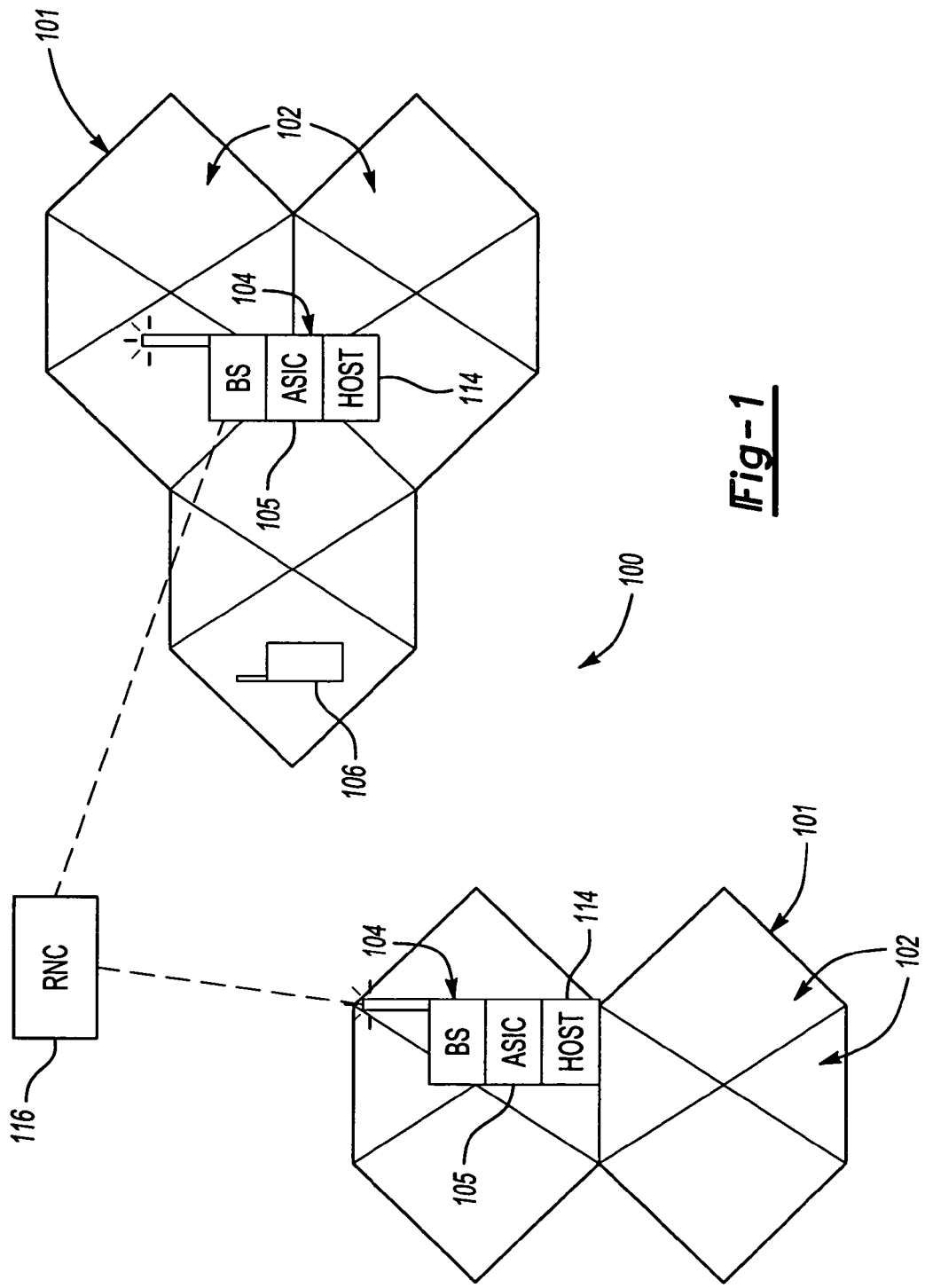
FIG. 1 is a representative diagram of a wireless communication system.

FIG. 1 is an illustrative example of the wireless communication system 100 in which the inventive method can be executed. As explained above, the system 100 is divided into cells 101 having multiple sectors 102 corresponding with different geographic areas, with each base station 104 being associated with one or more sectors 102. The base station 104 and the mobile device 106 can distinguish among the sectors 102 via any known metric implemented by, for example, a baseband processing application specific integrated circuit (ASIC) 105 in the base station 104. For example, each sector 102 may be associated with a particular Walsh symbol (also called a "Walsh cover"), which would be used by the base station 104 and the mobile device 106 to identify each sector 102.

The system 100 may also include at least one central entity that can handle data corresponding to multiple sectors 102 and/or multiple base stations 104. The central entity may be, for example, a host processor 114 in the base station 104 (which would be used when monitoring multiple sectors 102 associated with a single base station 104) or a radio network controller 116 (which would be used in soft handoff situations between two base stations 104). For purposes of the detailed description below, the sectors 102 that may be chosen by the mobile device 106 at a given time are considered to be members of an "active set," while the sector 102 that is linked with the mobile device 106 is called the "serving sector."

Although some of the examples described below assume that there are a plurality of sectors 102 associated with a plurality of base stations 104 and that the plurality of base stations 104 communicate with the radio network controller 116 as the central entity to indicate the status of the active set sectors 102, it is possible to conduct the inventive method without the radio network controller 116 if all of the active set sectors 102 being monitored are associated with the same base station 104 (i.e., if the active set can be evaluated by the baseband processing ASIC 105 of a single base station 104). In such a case, the host processor 114 in the base station 104 acts as the central entity and conducts the final determination of whether and when the mobile device 106 has switched to a new sector 102 without sending information to the radio network controller 116, leaving the host processor 114 to act as the only central entity. The general principles in all of the cases remain the same in both cases, however.

Resource metrics (e.g., data packets) may be transferred between the radio network controller 116 and the base stations 104. Typically, due to bandwidth constraints, the data packets are sent by the radio network controller 116 to only the base station 104 associated with the serving sector and not all of the base stations 104 associated with the active set sectors 102. Other metrics, such as the Walsh cover associated with the serving sector, are sent to all of the active set sectors 102 in this embodiment. Further, the sector switch indication from the mobile device 106 and computed metrics (e.g., the likelihood metrics associated with the mobile device's switch indication) are also forwarded by the monitoring base stations 104 to the central entity, which communicates with all of the base stations 104 monitoring the transmissions of the mobile device as explained above. The radio network controller 116 ensures that a switch detection algorithm is conducted in all of the base stations 104 associated with the sectors 102 in the active set. The radio network controller 116 may conduct its own independent determination based on reports from the base stations 104 regarding if and when the mobile device 106 will switch to a new sector 102.

In one embodiment, the central entity (e.g., the host processor 114 or the radio network controller 116) notifies the potential target sectors 102 that the mobile device 106 has transmitted a sector switch indication (SSI). In the case of a multiple base station 104 system, for example, the radio network controller 116 notifies the potential new target base stations 104 that the mobile device 106 has transmitted the SSI. This is because it is not possible to determine ahead of time which sector 102 or base station 104 in a given group of sectors 102 or base stations 104 will be able to detect the SSI from the mobile device 106 reliably. It is likely, but not guaranteed, that the target sector will be the one that detects the SSI because the signal quality between the target sector and the mobile device 106 is improving.

As is known in the art, the mobile device 106 will choose to switch from one sector 102 in the active set to another sector 102 because the quality of the data signal from the sector 102 that is currently serving the mobile device 106 is getting worse and the quality of the data signal from another sector 102 is improving. Further, the mobile transmits its switch indication in the same manner as it transmits other data in, for example, a CDMA2000 system (i.e., with a power that is adequate for reliable reception only at the sector with the strongest reverse link from the mobile device 106). If likelihood metrics are computed and the SSI is detected only at the serving sector 102 currently communicating with the mobile device 106, the poor signal link between the mobile device 106 and the base station 104 for the current serving sector 102 makes it likely that the base station 104 will miss the SSI. Note that poor signal links may also increase the likelihood that the base station 104 will falsely indicate detection of the SSI when no SSI was sent by the mobile device 106 (i.e., a "false alarm").

Once the central entity receives an SSI notification from one or more of the base stations 104, the central entity will notify all of the sectors 102 in the active set that the mobile device 106 will be switching to the new serving sector at a particular time. The other sectors 102 in the active set can then continue monitoring the transmission from the mobile device 106 with the knowledge that the mobile device 106 is being served by the base station 104 corresponding to the new serving sector. If any of the sectors 102 in the active set detects another SSI, the central entity re-executes the base station notification process described above.

Figure 2:
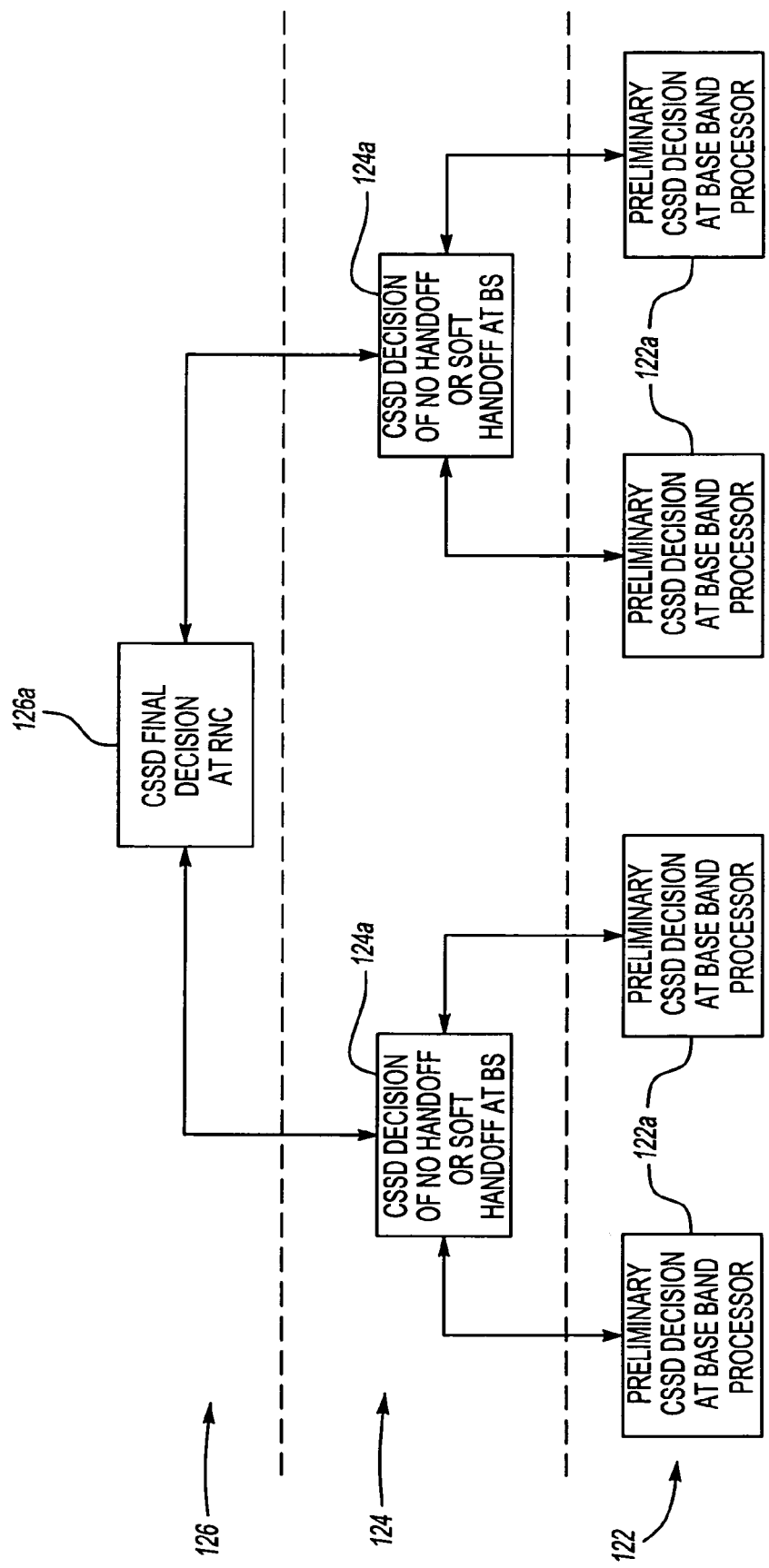
FIG. 2 is a representative diagram of a multi-stage architecture of a sector switching detection algorithm according to one embodiment of the invention.

FIG. 2 is a block diagram illustrating a general sector switch detection architecture 120 according to one embodiment of the invention. The steps in the inventive algorithm may be distributed across different components in the wireless communication system 100, with different elements being implemented in the baseband processing ASIC 105, the host processor 114, and optionally the radio network controller 116. The architecture 120 is divided into multiple stages reflecting the steps conducted for detecting the SSI from the mobile device 106. At a baseband processor stage 122, a preliminary switch detection decision 122a is conducted in the baseband processing ASIC 105 within each base station 104. Each individual decision 122a corresponds to the switch detection likelihood metrics for one of the sectors 102. This preliminary decision may be conducted via the algorithm described below and shown in FIGS. 3 through 5 to detect whether the mobile device 106 has sent the SSI.

Once the baseband processor stage 122 is complete, the information from the preliminary switch detection decision 122a from each sector 102 is evaluated at a base station stage 124. A decision 124a at the base station stage 124 determines, according to the metrics detected in that base station 104 and resulting from the decision(s) 122a in the baseband processor stage 122, whether or not to conclude that the mobile device 106 intends to switch from one sector 102 to another. As noted above, if all of the sectors 102 in the active set are associated with the same base station 104, then the base station stage decision 124a will be the final decision on the sector switch indication detection.

If the active set covers two or more base stations 104, however, the base station decisions 124a are treated as merely preliminary. In this case, the base station decisions 124a are sent to a central entity stage 126 in which, for example, the host processor 114 or the radio network controller 116 makes a final decision 126a based on the base station stage decisions 124a of whether or not the mobile device 106 sent the SSI and if so, to estimate the time at which the mobile device 106 will switch to the new sector 102 indicated by the mobile device 106.

Figure 3:
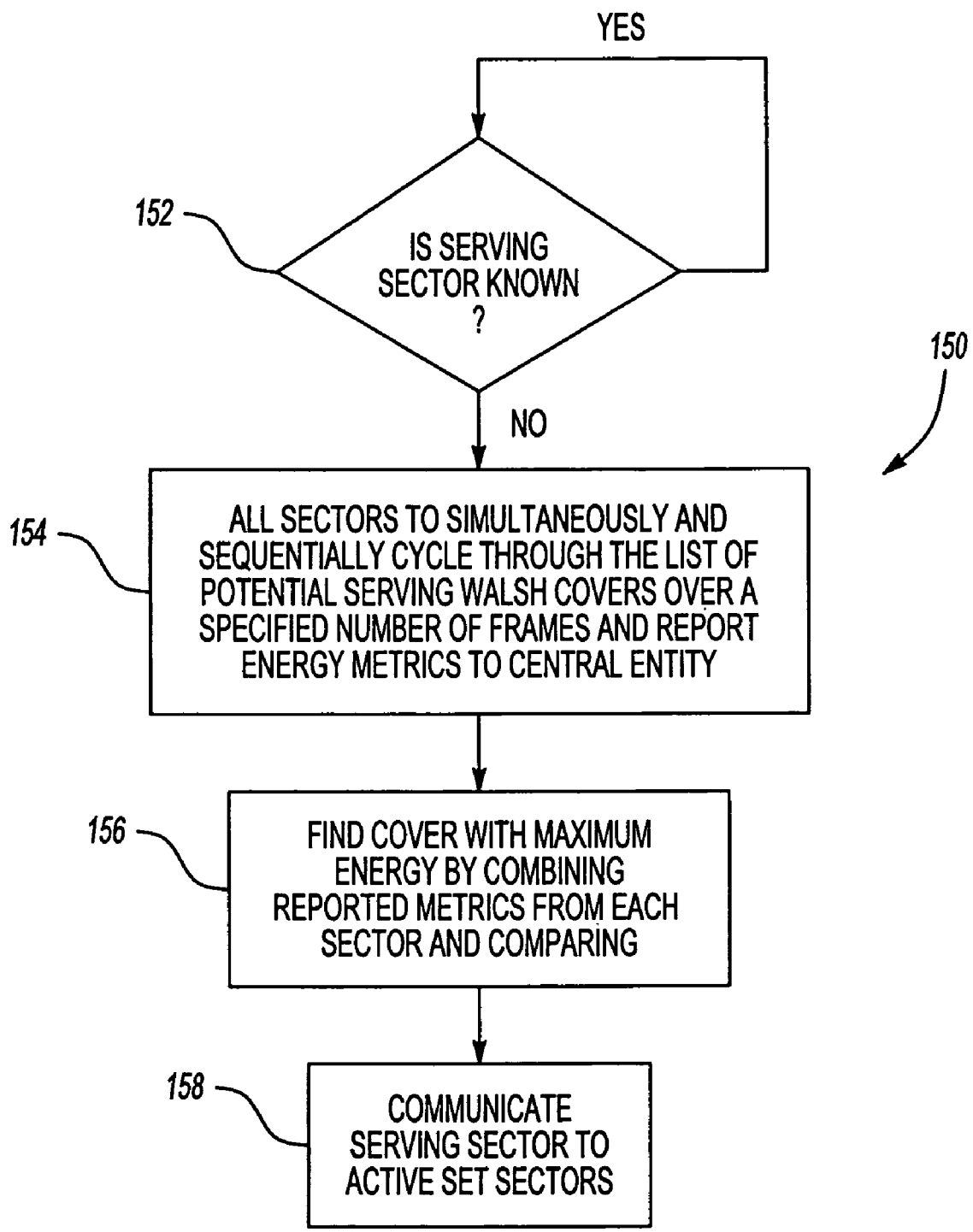
FIG. 3 is a flow diagram illustrating a sector monitoring process used in one embodiment of the invention.

The inventive sector switch detection algorithm operates on the premise that the base stations 104 in the active set know the identity of the current serving sector serving the mobile device 106. This assumption is valid whenever the switch detection at the network is reliable. FIG. 3 illustrates a supervision process 150 for locating the mobile device 106 and its associated serving sector 102 within the wireless communication system 100 when the system 100 has lost knowledge of the current serving sector because an SSI was missed or falsely detected. This process 150 may be carried at the central entity, such as in the host processor 114 and/or the radio network controller 116.

The process 150 starts by checking whether the current serving sector is known (block 152). This may be tested by sending a signal (e.g., a data packet) on the downlink channel from the serving sector 102 to the mobile device 106 and checking for an acknowledgement back from the mobile device 106 via a reverse acknowledgement channel. If the mobile device 106 device responds with either a positive or negative acknowledgement, it indicates that it is monitoring transmissions from the serving sector and receiving transmissions from it. The radio network controller will then continue to check whether the serving sector is known (block 152).

If the mobile device 106 does not respond on the reverse acknowledgement channel, however, the process 150 then shifts so that all of the sectors 102 in the active set simultaneously and sequentially cycle through a list of potential serving Walsh covers, which correspond to the potential new serving sectors over a specified number of frames to locate the mobile device 106 (block 154). The energy/likelihood metrics corresponding to the Walsh covers are then reported from the active set sectors 102 to the central entity (block 154).

The central entity then locates the Walsh cover with the highest energy/likelihood level and identifies the sector associated with that Walsh cover as the serving sector (block 156). Once the serving sector has been identified, its identity is sent to the sectors 102 in the active set (block 158)

Figure 4:
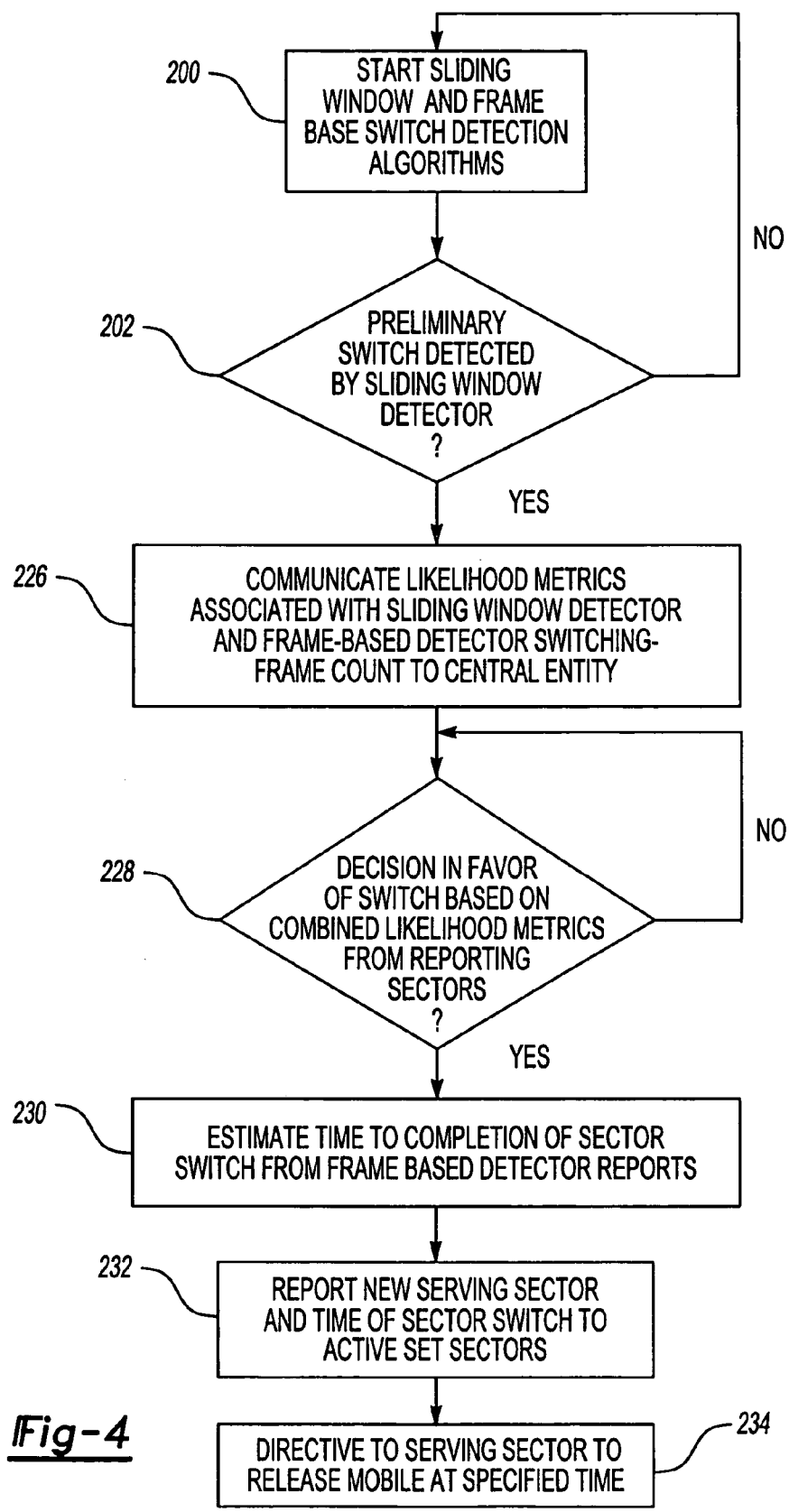
FIG. 4 is a flow diagram illustrating a sector switching detection algorithm according to one embodiment of the invention.
Figure 5:
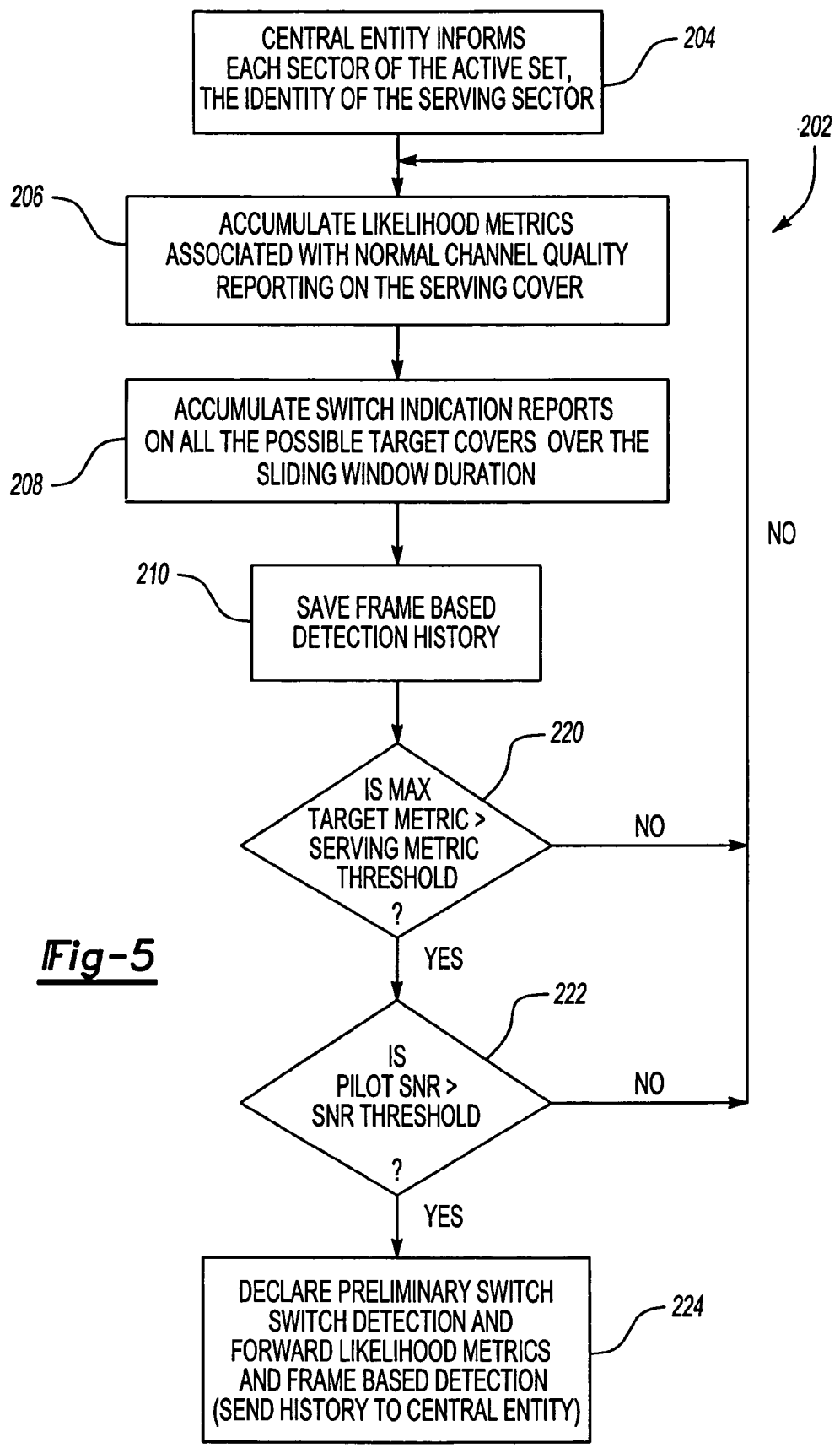
FIG. 5 is a flow diagram illustrating a portion of the sector switching detection in greater detail.

Once the serving sector, and therefore the location of the mobile device 106, has been identified, the communication system can move into actual sector switch detection. FIGS. 4 and 5 are flow diagrams that illustrate a sector switch detection algorithm according to one embodiment of the invention in greater detail. Generally, the inventive algorithm runs two switch detection processes concurrently and independently. In one embodiment, the first switch detection process is frame-based and the second switch detection process is window-based. As is known in the art, each frame period is a multiple-slot interval. The SSI may be transmitted from the mobile device 106 in selected consecutive switch indication slots within the frame and will continue for a predetermined number of frames.

Both the frame-based and sliding window-based switch detection processes may be conducted by the individual base stations 104 associated with the sectors in the active set as preliminary switch detections, with the final switch detection decision being conducted by the central entity (e.g., in the host processor 114 or the radio network controller 116). Conducting both switch detection processes at the base stations 104 rather than in the central entity eliminates the need to transfer switch detection data from the base stations 104 to the central entity for switch detection, reducing the usage of bandwidth on the link from the base stations 104 to the central entity (e.g., the radio network controller 116).

The sliding window-based switch detection process is generally responsible for preliminary sector switch detection and can both suppress false alarms and reduce the probability of missed SSIs by accumulating switch detection metrics over an extended time interval. For example, if the algorithm is monitoring a reverse channel quality indicator channel (R-CQICH), on which the mobile device 206 makes SSI, having a frame period of 20 ms, the sliding window-based switch detection process will operate over a selected multiple of 20 ms periods. The frame-based detection switch detection process, on the other hand, supplements the sliding window-based detection process and operates over a single frame period (e.g., each 20 ms R-CQICH period), detecting whether the mobile device 106 has sent the SSI at any time within that period. If the SSI is detected using the sliding window-based switch detection process, then the instances of frame-based switch detections within the sliding window can be used to decide when sector switching will complete. The sliding window-based process has greater reliability than the frame-based process by looking across multiple frames and has a very low probability of missed SSIs and false alarms. Note that the sliding window-based switch detection process may detect an SSI even when the mobile device 106 has transmitted fewer successive switch indication frames than the duration of the sliding window. In this scenario, the instances of frame-based detection over the sliding window interval are used to estimate the amount of time that the mobile device 106 has been conducting the sector switching process and therefore the time at which the mobile device 106 can be expected to complete the switching process.

In other words, the frame-based switch detection process checks each frame in isolation for the SSI, while the sliding window-based switch detection process looks at the SSI behavior collectively over multiple frames. The frame-based switch detection process and the sliding window-based switch detection process may together be considered a distributed switch detection algorithm because the algorithm is conducted among all of the sectors 102 in the active set.

Because the SSI is embedded in the R-CQICH frame, the frame-based process can improve a channel quality indicator (CQI) and erasure statistic reporting. Moreover, the frame-based process can also support hybrid automatic repeat request (HARQ) operations, if needed. The inventive algorithm therefore improves sector switch detection while minimizing the disruption of CQI reports and HARQ transmissions.

Referring to FIG. 4, the sector switch detection algorithm begins by starting the sliding window-based switch detection algorithm and the frame-based switch detection algorithm in each sector 102 in the active set (block 200). At the end of each frame period, each sector 102 in the active set will check whether the sliding window-based switch detection algorithm indicates a preliminary switch detection (block 202).

FIG. 5 illustrates one way in which the sliding window-based switch detection algorithm (block 202) is conducted. The central entity, such as the host processor 114 or the radio network controller 116, notifies each sector 102 in the active set the identity of the current serving sector (block 204). Each sector 102 in the active set then begins to accumulate its own set of likelihood metrics. In one embodiment, a first likelihood metric is associated with the normal channel quality reports on the Walsh cover identifying the serving sector (block 206). An additional set of likelihood metrics is associated with switch indication reports on all of the Walsh covers of the possible target new serving sectors over the sliding window duration (block 208). The largest of this set of likelihood metrics will be called a second likelihood metric. In the description below, the first likelihood metric is also called the serving metric and the second likelihood metric is also called the target metric.

In other words, the first and second likelihood metrics respectively indicate the probabilities at a given receiving sector that the mobile device 106 is reporting normal channel quality corresponding to the serving sector and the probability that the mobile device 106 is reporting a switch indication corresponding to its intention to receive service from one of the possible target serving sectors.

Note that knowing the Walsh cover of the serving sector reduces the number of hypotheses to test during the switch detection process and therefore improves the reliability of the tests, and/or reduces the power at which the SSI needs to be transmitted by the mobile device 106 to be detected by the sectors. More particularly, if the identity of the serving sector is known, a given receiving sector does not need to test for the hypothesis and possibility that the mobile device 106 is sending a switch indication to the current serving sector. Additionally, any receiving sector would have difficulty distinguishing between normal CQ reports and the SSI when both are on the same Walsh cover. By reducing the number of hypotheses to be tested and eliminating those hypothesis that are difficult to distinguish, the inventive method increases the odds of making a correct determination of the mobile device's SSI transmission. Alternatively, for the same expected level of performance, the power with which the mobile device 106 makes the transmission can be lowered.

At the same time, concurrently and independently, the frame-based switch detection process includes maintaining a frame-based detection history, such as a shift register, each time the sector 102 generates a preliminary switch indication report (block 210). Each sector 102 in the active set has its own associated history. The frame-based detection counter tracks the number of frame-based switch detections within the sliding window period.

Once the sectors 102 in the active set have gathered their corresponding first and second likelihood metrics, each sector 102 checks whether the largest target metric over the sliding window is greater than the serving metric accumulated over the same sliding window plus a threshold (block 220). In one embodiment, this step is conducted at the end of every frame. If the largest target metric in the sliding window falls below the serving metric plus the threshold, it indicates a high likelihood that the mobile device 106 has not sent an SSI. The algorithm then returns to accumulating and checking the likelihood metrics over the sliding window duration (block 206). Note that the sliding window over which the likelihood metrics are accumulated will check over a different set of frames in each iteration because the new accumulated likelihood metrics will drop the metrics associated with the oldest frame in the previous sliding window and include the metrics for the most recent frame.

If the largest target metric is greater than the serving metric plus the threshold (block 220), it indicates a likelihood that the mobile device 106 has sent an SSI. To confirm this, each sector 102 in the active set also checks whether a pilot channel signal-to-noise ratio (SNR) is greater than an SNR threshold (block 222). This step is performed to reduce the probability of false alarms at sectors with weak links to the mobile device 106 by ensuring that the pilot channel signal strength is strong compared to any noise in the pilot channel.

Note that the sliding window duration and threshold are set to certain values based on the expectation that the mobile device's signal will be received with a certain minimum signal strength or pilot SNR at a given sector 102. This is ensured via power control from the sector 102, which is directed from the sector 102 to the mobile device 106, to raise or lower its transmission power to maintain a certain pilot SNR at the sector 102. In cases where the mobile device 106 is communicating with multiple sectors 102, each sector 102 directs the mobile device 106 or raise or lower its power based on the signal strength received by the sector 102.

Because the mobile device 106 lowers its power if any sector 102 requests it, it is likely that the minimum signal strength may not be met at all by one of the sectors 102. At sectors with weaker links, this means that the sliding window-based process may produce more false alarms than is considered acceptable. The pilot SNR threshold used in block 222 reduces these false alarms. Note, however, that this may increase the probability of missed SSIs, but this is acceptable because the inventive algorithm can still rely on the sector or sectors with strong links to detect the SSI.

If the pilot channel SNR is higher than the SNR threshold (block 222), it indicates that the signal link between the particular receiving sector 102 and the mobile device 106 is acceptable and therefore the receiver in the receiving sector can have confidence in its detection of the SSI from the mobile device 106. If this occurs, the sliding window-based switching algorithm (block 202) at that particular sector 102 declares a preliminary switch detection (block 224).

Referring back to FIG. 4, the algorithm includes communicating the likelihood metrics associated with the sliding window-based switch detection process and the history output from the frame-based switch detection process to the central entity (i.e., the host processor 114 or the radio network controller 116) (block 226). From this information, the central entity decides whether to declare a switch to a new serving sector based on the combined likelihood metrics from the sectors 102 in the active set (block 228). In one embodiment, the central entity (i.e., the host processor 114) declares a final sector switch detection decision if it receives preliminary sector switch detection determinations from one of the sectors 102 associated with only one base station 104. If the active set sectors 102 correspond with more than one base station, and if more than one base station 104 sends simultaneous reports of the preliminary sector switch detection, the central entity (i.e., the radio network controller 116) adds together the reported likelihood metrics from each reporting base station 104 to make its final determination on whether the mobile device 106 has indeed sent the SSI (block 228).

Regardless of the specific device acting as the central entity, the central entity also estimates the time at which the sector switching will be completed from the frame-based switch detection results (block 230). More particularly, the history (e.g., shift register contents) will reflect the time at which the mobile device 106 started sending the SSI and therefore the time location of the mobile device 106 within the switch indication period. From this information, the central entity can also estimate the time at which the switch indication period will end and therefore when the mobile device 106 will switch to the new serving sector because the total switch indication period is known (block 230).

The central entity may then report the identity of the new serving sector and the time at which the switching will take place to the sectors 102 in the active set (block 232). The process may also include sending an optional directive to the current serving sector to release the mobile device 106 at a specified time (block 234) and enable it to start monitoring the new serving sector without waiting for the switch indication period to expire.

By combining a frame-based switch detection process and a sliding-window switch detection process into a single sector switch detection algorithm, the inventive method can reliably detect both the time and occurrence of a sector switch indication from a mobile device while keeping the probabilities of false alarms and missed indications low. Moreover, by conducting the primary switch detection algorithm processes in the individual base stations receiving the SSI rather than in the radio network controller, the radio network controller in the wireless communication system only needs to act on the detection of an actual sector switch by the base stations without having to execute the entire detection algorithm. In other words, the complex calculations for conducting the switch detection are done by the base stations, not the central entity. This eliminates the need to transfer data from the base stations to the central entity for analysis and also simplifies the algorithm to be conducted in the central entity.

Furthermore, by using metrics generated by all of the base stations in the active set, as opposed to only the serving base station or the target base station, the inventive algorithm conducts a centralized decision on whether or not the mobile has indicated a sector switch. Thus, the algorithm takes into account the potential unreliability of channel receptions at any single base station (e.g., serving or target).

The inventive method therefore optimizes the tradeoff between false alarms and missed detections, minimizing missed detections without increasing the likelihood of false alarms in the process. By implementing the above-described algorithms, the inventive method is able to detect reliably a sector switch indication from a mobile device as well as determine the timing of the mobile device in the switch indication process, that is, estimate when the mobile device has started the switch indication and thereby estimate when the mobile device will complete the switch indication and switch to the new serving sector.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, this method, system and portions thereof and of the described method and system may be implemented in different locations, such as network elements, the wireless unit, the base station, a base station controller, a mobile switching center and/or radar system. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

We claim:

1. A method of wireless communication, comprising:
   monitoring a plurality of frames on a channel;
   determining at least one window-based decision metric based on a sector switching indicator in at least one frame within a window containing at least two frames;
   determining a number of frames within the window that contain the sector switching indicator; and
   determining whether a sector switch is desired based on the determined at least one decision metric and the determined number of frames.

2. The method of claim 1, comprising
   determining a set of first window-based decision metrics based on the frames within the window;
   determining a set of second window-based decision metrics based on the frames within the window;
   determining which of the determined second metrics is the largest metric;
   determining whether the determined largest metric exceeds a selected threshold plus an accumulated value of the first metrics over the window.

3. The method of claim 2, comprising
   determining that a mobile station transmitting data in the frames within the window provided the sector switching indicator based on whether the determined largest metric exceeds the selected threshold plus the accumulated value of the first metrics.

4. The method of claim 3, comprising
   determining a pilot signal to noise ratio for each sector in an active set of the mobile station for confirming the determining that the mobile station provided a valid sector switching indicator.

5. The method of claim 1, comprising
   determining a time when a first one of the determined number of frames was sent; and
   using the determined time to predict when a mobile station will switch to a sector corresponding to the sector switching indicator.

6. The method of claim 1, comprising
   comparing a pilot signal-to-noise ratio for each of an active set of sectors with a signal-to-noise ratio threshold; and
   indicating an acceptable signal link if the corresponding pilot signal-to-noise ratio is greater than the signal-to-noise ratio threshold.

7. The method of claim 1, wherein determining whether a sector switch is desired is a preliminary switch detection decision, and the method comprises
   forwarding the preliminary switch detection decision to a central entity; and
   conducting a final switch detection decision based on a plurality of preliminary switch detection decisions.

8. The method of claim 1, comprising
   establishing a window length including a selected number of frames;
   performing the monitoring step and the determining steps using a first plurality of frames within the window length; and sliding the window to a second plurality of frames that includes a next subsequent frame and all but an oldest one of the first plurality of frames.

9. The method of claim 1, comprising
obtaining a serving metric corresponding to a normal channel quality report for a serving sector; and
obtaining a target metric corresponding to a highest probability that the sector switching indicator has been sent to any one of an active set of sectors.

10. The method of claim 9, comprising:
accumulating a plurality of the target metrics over the window;
selecting a largest target metric out of the plurality of target metrics; and
indicating a likelihood that the sector switching indicator has been sent if the largest target metric is above the serving metric plus a threshold.

11. The method of claim 10, comprising
estimating a sector switch completion time.

12. The method of claim 11, comprising
directing the serving sector to release a corresponding mobile device at a time selected based on the estimated sector switch completion time; and
notifying the active set of sectors of the selected time.

13. A method of detecting a sector switching indicator, comprising:

conducting a plurality of preliminary switch detection decisions in a baseband processor stage, wherein each preliminary switch detection decision corresponds to one of a plurality of active set sectors and each preliminary switch detection decision is based upon at least one metric determined over a window containing a plurality of frames and a sector switching indicator detected within at least one of the plurality of frames;
forwarding the plurality of preliminary switch detection decisions to a base station stage;
conducting a second switch detection decision based on the plurality of preliminary switch detection decisions in the base station stage; and
determining whether the sector switching indicator has been sent based on the second switch detection decision in the base station stage.

14. The method of claim 13, wherein the second switch detection decision is a final switch detection decision.

15. The method of claim 13, wherein the step of conducting the second switch detection decision comprises conducting a plurality of second switch detection decisions, and wherein the determining step comprises
conducting a third switch detection decision based on the plurality of second switch detection decisions; and
determining whether the sector switching indicator has been sent from the third switch detection decision.

* * * * *